(12) United States Patent
Devall

(10) Patent No.: US 7,077,110 B2
(45) Date of Patent: Jul. 18, 2006

(54) RETURN FUEL TEMPERATURE CONTROL MODULE

(75) Inventor: Jeffrey E. Devall, Cambridge City, IN (US)

(73) Assignee: Stant Manufacturing Inc., Connersville, IN (US)

( * ) Notice: Subject to any disclaimer, the term of this patent is extended or adjusted under 35 U.S.C. 154(b) by 311 days.

(21) Appl. No.: 10/790,334

(22) Filed: Mar. 1, 2004

(65) Prior Publication Data
US 2005/0188961 A1    Sep. 1, 2005

(51) Int. Cl.
*F02M 37/04* (2006.01)

(52) U.S. Cl. ......................... 123/514; 123/541

(58) Field of Classification Search ........... 123/514, 123/516, 541, 41.31, 456; 165/41, 51
See application file for complete search history.

(56) References Cited

U.S. PATENT DOCUMENTS

| | | | |
|---|---|---|---|
| 4,364,355 A * | 12/1982 | Karino | 123/438 |
| 4,411,239 A * | 10/1983 | Kelch | 123/557 |
| 4,452,213 A | 6/1984 | Duprez | |
| 4,502,450 A | 3/1985 | Duprez | |
| 4,629,560 A | 12/1986 | Harris | |
| 5,156,134 A * | 10/1992 | Tochizawa | 123/541 |
| 5,251,603 A * | 10/1993 | Watanabe et al. | 123/541 |
| 5,584,279 A * | 12/1996 | Brunnhofer | 123/541 |
| 6,250,290 B1 * | 6/2001 | Mullen | 123/541 |
| 6,405,712 B1 * | 6/2002 | Nomura | 123/456 |
| 6,457,460 B1 * | 10/2002 | Doane et al. | 123/541 |
| 6,729,310 B1 * | 5/2004 | Ekstam | 123/516 |
| 6,848,433 B1 * | 2/2005 | Scoggins | 123/541 |

FOREIGN PATENT DOCUMENTS

| | | |
|---|---|---|
| CA | 1 136 501 | 11/1982 |
| CA | 1 208 998 | 8/1986 |

* cited by examiner

*Primary Examiner*—Carl S. Miller
(74) *Attorney, Agent, or Firm*—Barnes & Thornburg LLP

(57) ABSTRACT

A return fuel temperature control module is adapted for use in controlling the temperature of fuel diverted away from an engine and returned to a fuel tank. The module includes a housing formed to include passageways and a flow controller to control flow of fuel through the passageways.

36 Claims, 5 Drawing Sheets ered to the fuel tank.

RETURN FUEL TEMPERATURE CONTROL MODULE

BACKGROUND

The present disclosure relates to apparatus for controlling the temperature of fuel. More particularly, the present disclosure relates to apparatus for controlling the temperature of fuel diverted away from an engine and returned to a fuel tank.

Fuel systems are used to supply fuel from a fuel tank to an engine. In some fuel systems, fuel that is not used by the engine is returned to the fuel tank.

SUMMARY

According to the present disclosure, a return fuel temperature control module is adapted for use in controlling the temperature of fuel diverted away from an engine and returned to a fuel tank. The module includes a module housing and a flow controller. Module housing is formed to include an insulator passageway adapted to insulate thermally fuel flowing therethrough, a cooler passageway adapted to cool fuel flowing therethrough and arranged in a parallel flow arrangement with the insulator passageway, and a flow-controller passageway located downstream from the insulator and cooler passageways to receive fuel therefrom. The flow controller is positioned in the flow-controller passageway and is responsive to temperature of fuel in the flow-controller passageway to control flow of fuel from the insulator and cooler passageways to the flow-controller passageway. The return fuel temperature control module is thus able to promote compliance of the temperature of fuel discharged from the module housing with predetermined temperature criteria.

The flow controller includes a valve, a valve mover, and a fuel temperature sensor. The valve mover is arranged to move the valve between a lower temperature position, an intermediate temperature position, and a higher temperature position in response to temperature of fuel sensed by the temperature sensor in the flow-controller passageway.

The valve mover positions the valve in the lower temperature position when the sensor senses that the temperature of fuel in the flow-controller passageway is below a predetermined lower temperature. In the lower temperature position, the valve blocks flow of fuel from the cooler passageway to the flow-controller passageway and allows flow of fuel from the insulator passageway to the flow-controller passageway to minimize the risk of gelling of fuel returning to the fuel tank.

The valve mover positions the valve in the intermediate temperature position when the sensor senses that the temperature of fuel in the flow-controller passageway is between the predetermined lower temperature and a predetermined higher temperature. In the intermediate temperature position, the valve allows flow of fuel from both the insulator passageway and the cooler passageway to the flow-controller passageway.

The valve mover positions the valve in the higher temperature position when the sensor senses that the temperature of fuel in the flow-controller passageway is higher than the predetermined higher temperature. In the higher temperature position, the valve blocks flow of fuel from the insulator passageway to the flow-controller passageway and allows flow of fuel from the cooler passageway to the flow-controller passageway to minimize the risk of deformation or other damage that could possibly be caused to some fuel tanks by relatively hot fuel.

Illustratively, a piston included in the valve mover and the temperature sensor cooperate to provide a wax motor. The sensor includes a motor housing and temperature responsive wax positioned in the motor housing. The piston is extensible from the motor housing to move the valve in sequence from the lower temperature position to the intermediate temperature position and to the higher temperature position. When the wax contracts due to cooling of fuel, a piston retractor causes the piston to retract into the motor housing and a valve return moves the valve back toward the lower temperature position.

Additional features of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION

Figure 1:
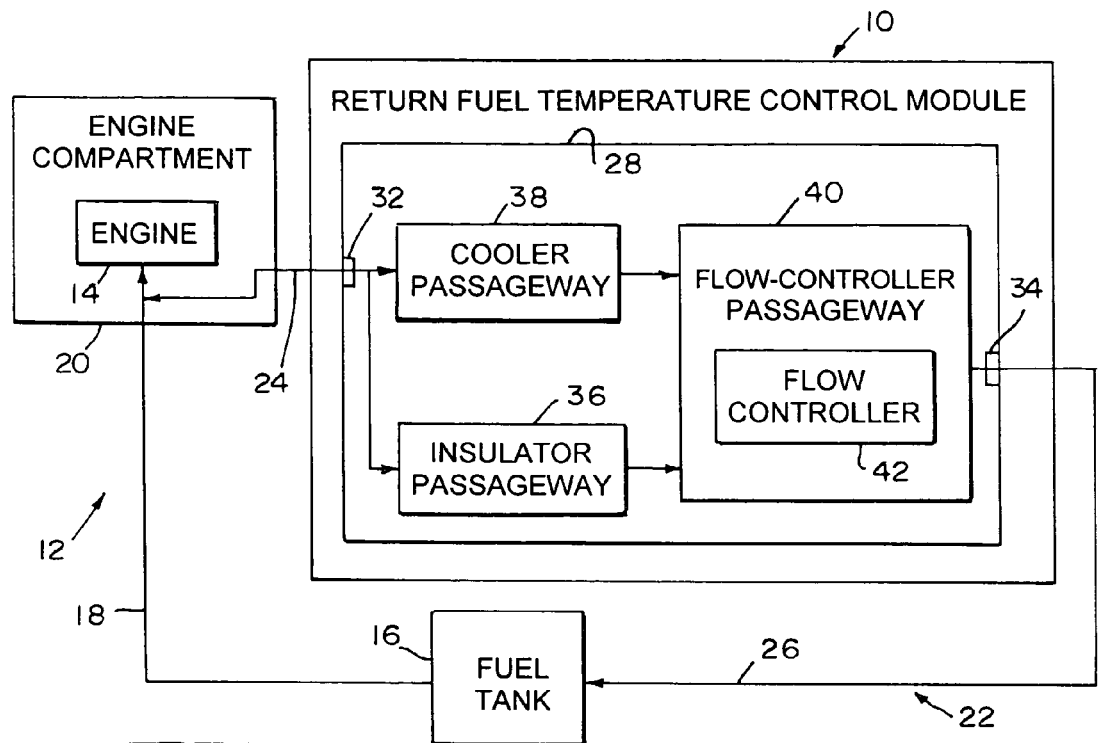
FIG. 1 is a diagrammatic view showing a return fuel temperature control module that is adapted to control the temperature of fuel diverted away from an engine and returned to a fuel tank and that includes a flow controller positioned in a flow-controller passageway to control flow of fuel thereto from an insulator passageway adapted to insulate thermally fuel flowing therethrough and a cooler passageway adapted to cool fuel flowing therethrough.

A return fuel temperature control module 10 is adapted for use in a fuel system 12 to control the temperature of fuel diverted away from an engine 14 and returned to a fuel tank 16, as shown diagrammatically, for example, in FIG. 1. Fuel from fuel tank 16 is supplied by a fuel supply line 18 for use by engine 14 which is located in an engine compartment 20. Fuel not used by engine 14 is diverted away from engine 14 for return back to fuel tank 16 through a fuel return line 22. Module 10 is included in fuel return line 22 between an upstream fuel return line portion 24 which interconnects fuel supply line 18 and module 10 and a downstream fuel return line portion 26 which interconnects module 10 and fuel tank 16.

Module 10 includes a module housing 28, as shown diagrammatically, for example, in FIG. 1. Module housing 28 is formed to include an inlet aperture 32 and an outlet aperture 34. Inlet aperture 32 is adapted to admit fuel from upstream fuel return line portion 24 into module housing 28. Outlet aperture 34 is adapted to discharge fuel from module housing 28 to downstream return fuel line portion 26.

Module housing 28 is formed to include an insulator passageway 36, a cooler passageway 38, and a flow-controller passageway 40, as shown diagrammatically, for example, in FIG. 1. Insulator passageway 36 is located downstream from inlet aperture 32 to receive fuel therefrom and is adapted to insulate thermally fuel flowing through insulator passageway 36. Cooler passageway 38 located downstream from housing module inlet 32 in a parallel flow arrangement with insulator passageway 36 and is adapted to cool fuel flowing through cooler passageway 38. Flow-controller passageway 40 is arranged downstream from insulator and cooler passageways 36, 38 to receive fuel therefrom. Flow-controller passageway 40 extends from insulator and cooler passageways 36, 38 to outlet aperture 34 to conduct fuel from insulator and cooler passageways 36, 38 to outlet aperture 34.

Module 10 includes a flow controller 42, as shown, diagrammatically in FIG. 1. Flow controller 42 is positioned in flow-controller passageway 40 and is responsive to temperature of fuel in flow-controller passageway 40 to control flow of fuel from insulator and cooler passageways 36, 38 to flow-controller passageway 40 to promote compliance of the temperature of fuel discharged from outlet aperture 34 with predetermined temperature criteria.

Figure 2:
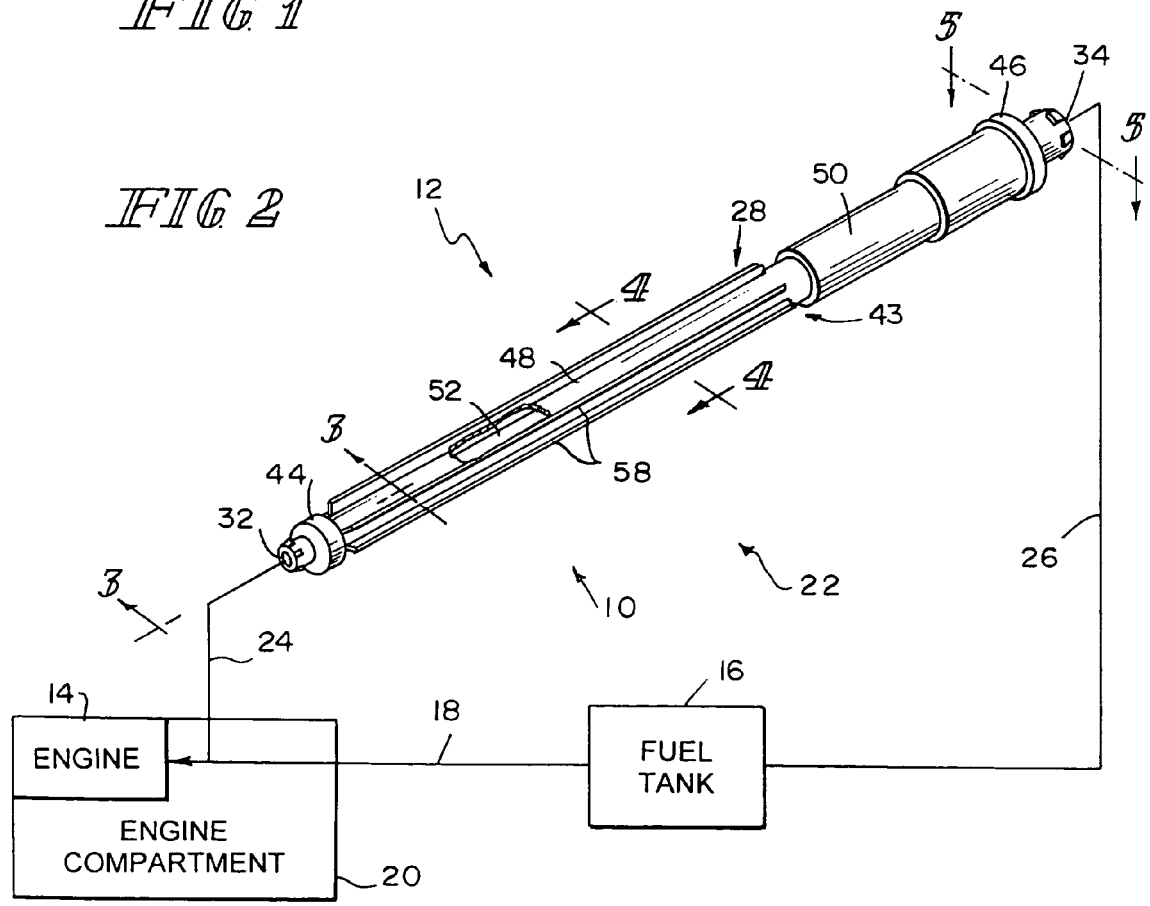
FIG. 2 is a perspective view of the return fuel temperature control module.
Figure 3:
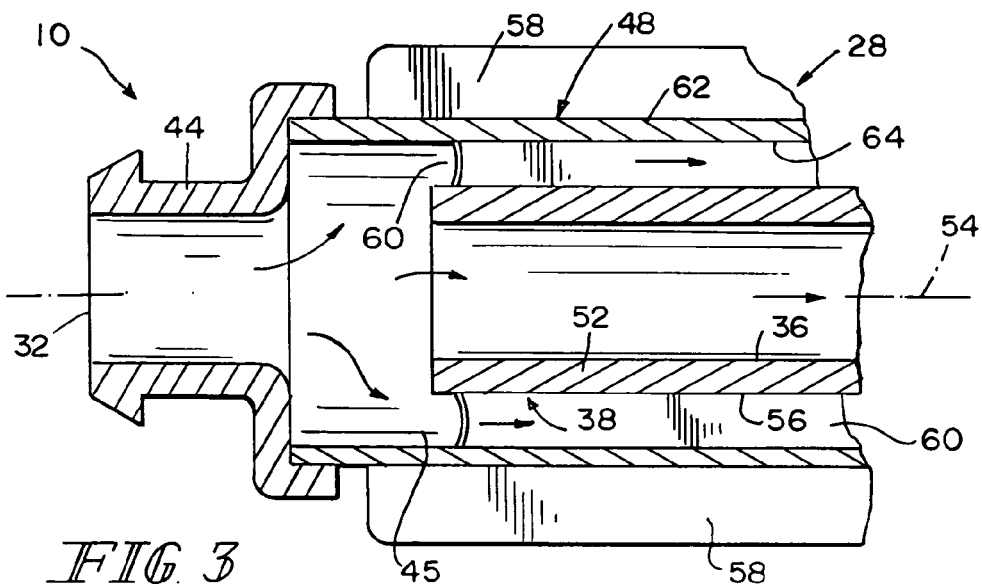
FIG. 3 is a sectional view taken along lines 3—3 of FIG. 2 showing an inner insulator tube formed to include the insulator passageway, an outer cooler tube surrounding the insulator tube to provide an upstream portion of the cooler passageway therebetween, and an inlet end cap coupled to the cooler tube and formed to include an inlet aperture to admit fuel into the module.

Module housing 28 includes a shell 43, as shown, for example, in FIG. 2. Shell 43 is formed to include an interior region 45 and includes an inlet end cap 44, an outlet end cap 46, a cooler tube 48, and an outer tube 50. Inlet end cap 44 is formed to include inlet aperture 32 and is coupled to cooler tube 48. Outlet end cap 46 is formed to include outlet aperture 34 and is coupled to outer tube 50. Cooler tube 48 and outer tube 50 are coupled to one another.

Module housing 28 includes an insulator tube 52 positioned in interior region 45, as shown, for example, in FIGS. 2–7. Insulator tube 52 is formed to include insulator passageway 36. Insulator tube 52 is made of a thermally insulating material to insulate thermally fuel flowing through insulator passageway 36. The insulating material is, for example, nylon.

Cooler tube 48 surrounds insulator tube 52, as shown, for example, in FIGS. 3–7. Cooler tube 48 and insulator tube 52 are positioned in coaxial relation with one another relative to an axis 54 of module 10. Cooler tube 48 and insulator tube 28 cooperate to provide therebetween an annular upstream portion 56 of cooler passageway 38. Upstream portion 56 surrounds insulator passageway 36.

Figure 4:
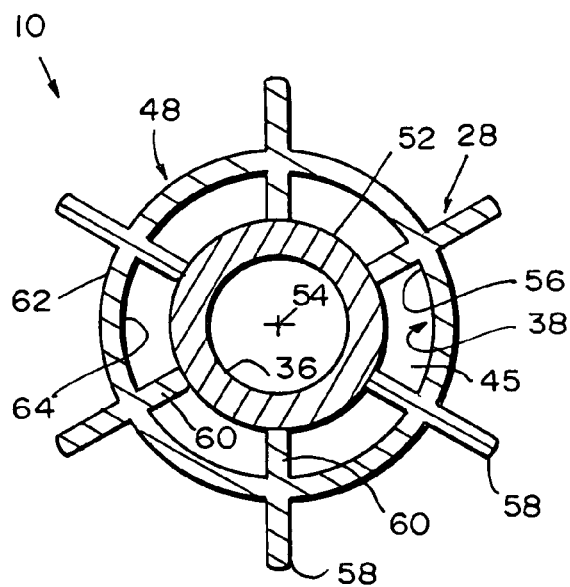
FIG. 4 is a sectional view taken along lines 4—4 of FIG. 2 showing the cooler tube surrounding the insulator tube in coaxial relation therewith, a plurality of heat exchanger outer fins coupled to an outer surface of the cooler tube, and a plurality of heat exchanger inner fins that are coupled to an inner surface of the cooler tube and extend to the insulator tube to position the insulator tube within the cooler tube.
Figure 8:
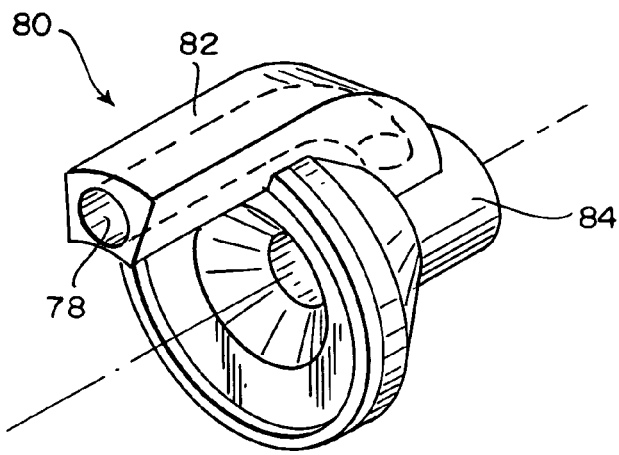
FIG. 8 is a perspective view showing a component included in the housing of the module.

Module housing 28 includes a plurality of axially extending outer fins 58 and a plurality of axially extending inner fins 60 to promote transfer of heat from cooler passageway 38 outside module 10, as shown, for example, in FIG. 4. Outer fins 58 are coupled to and extend radially outwardly from an outer surface 62 of cooler tube 48. Outer fins 58 are spaced circumferentially apart from one another. Inner fins 60 are coupled to and extend radially inwardly from an inner surface 64 of cooler tube 48 to insulator tube 52 to position insulator tube 52 in interior region 45. Inner fins 60 are spaced circumferentially apart from one another. Each outer fin 58 is aligned radially with a companion inner fin 60.

Cooler tube 48 and outer and inner fins 58, 60 are made of a thermally conductive material. The thermally conductive material is, for example, aluminum which is extruded to form cooler tube 48 and fins 58, 60. As such, cooler tube 48 and fins 58, 60 illustratively form a monolithic component. It is within the scope of this disclosure to omit any or all of fins 58, 60.

Figure 5:
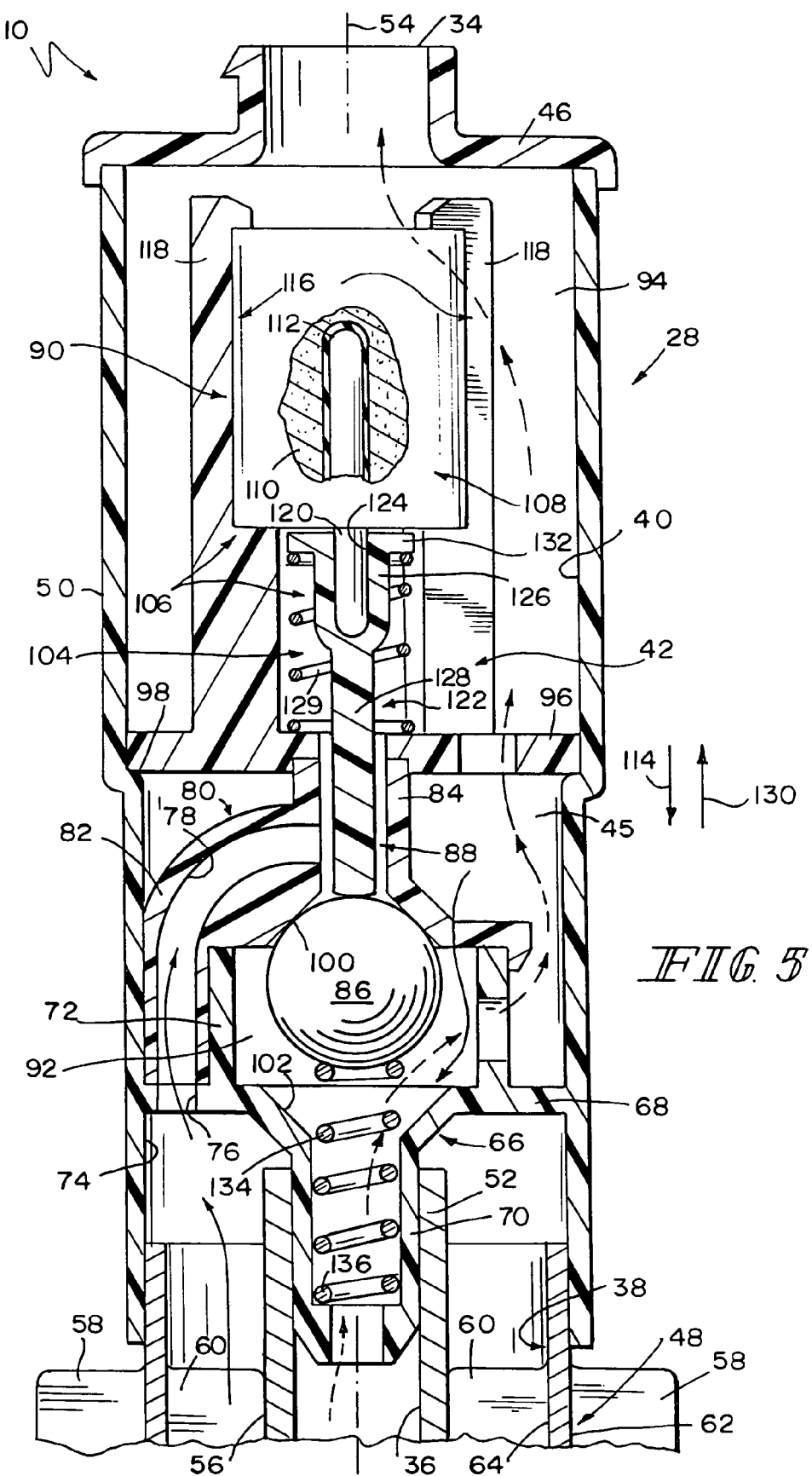
FIG. 5 is a sectional view taken along lines 5—5 of FIG. 2 showing a valve positioned in a lower temperature position allowing flow of fuel from the insulator passageway to a flow-controller passageway for discharge to the fuel tank and blocking flow of fuel from the cooler passageway to the flow-controller passageway when a wax motor senses that the temperature of fuel in the flow-controller passageway is lower than a predetermined lower temperature.
Figure 6:
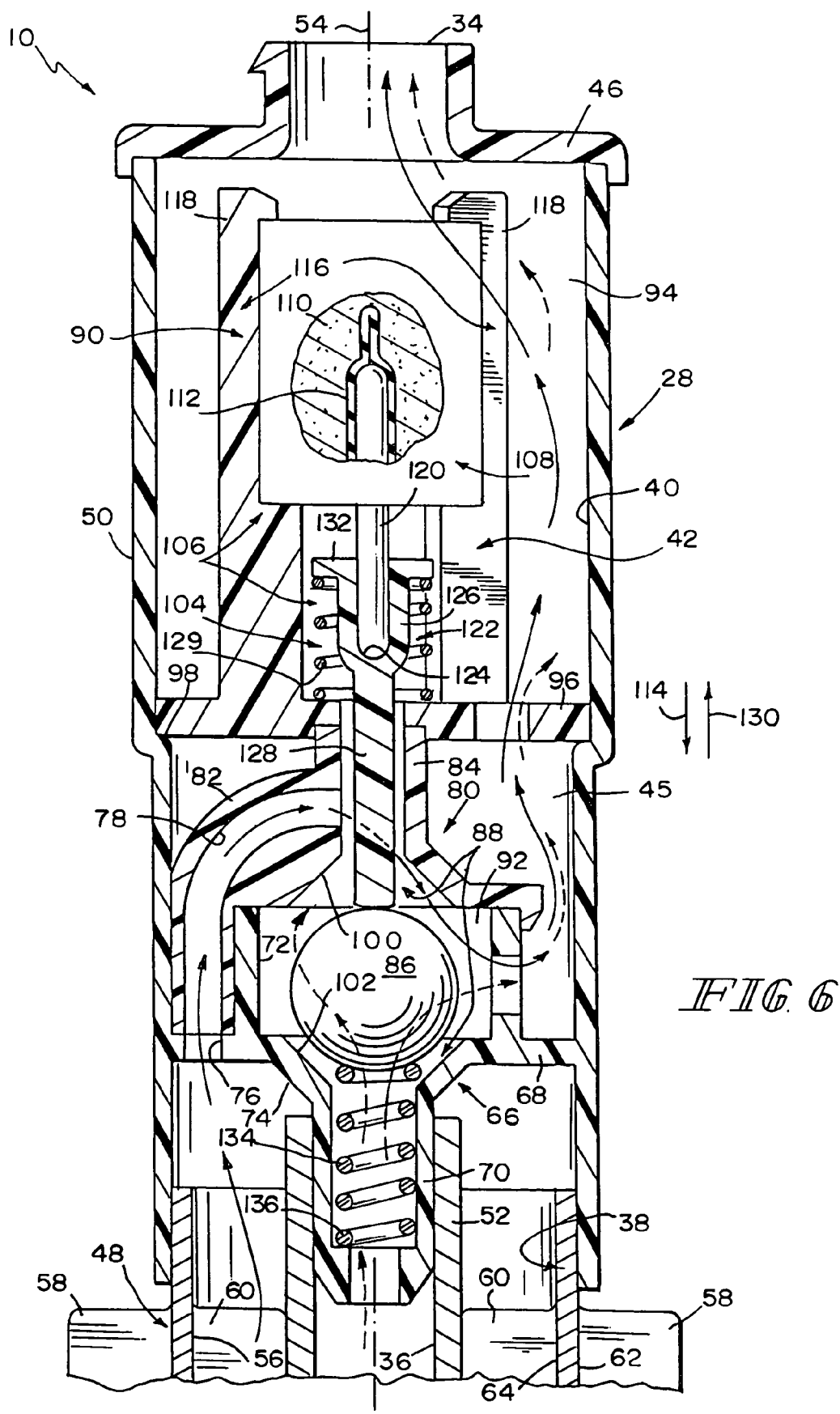
FIG. 6 is a sectional view similar to FIG. 5 showing a piston of the wax motor positioning the valve in an intermediate temperature position allowing flow of fuel from the insulator passageway and the cooler passageway to the flow-controller passageway when the wax motor senses that the temperature of fuel in the flow-controller passageway is at an intermediate temperature between the predetermined lower temperature and a predetermined higher temperature.
Figure 7:
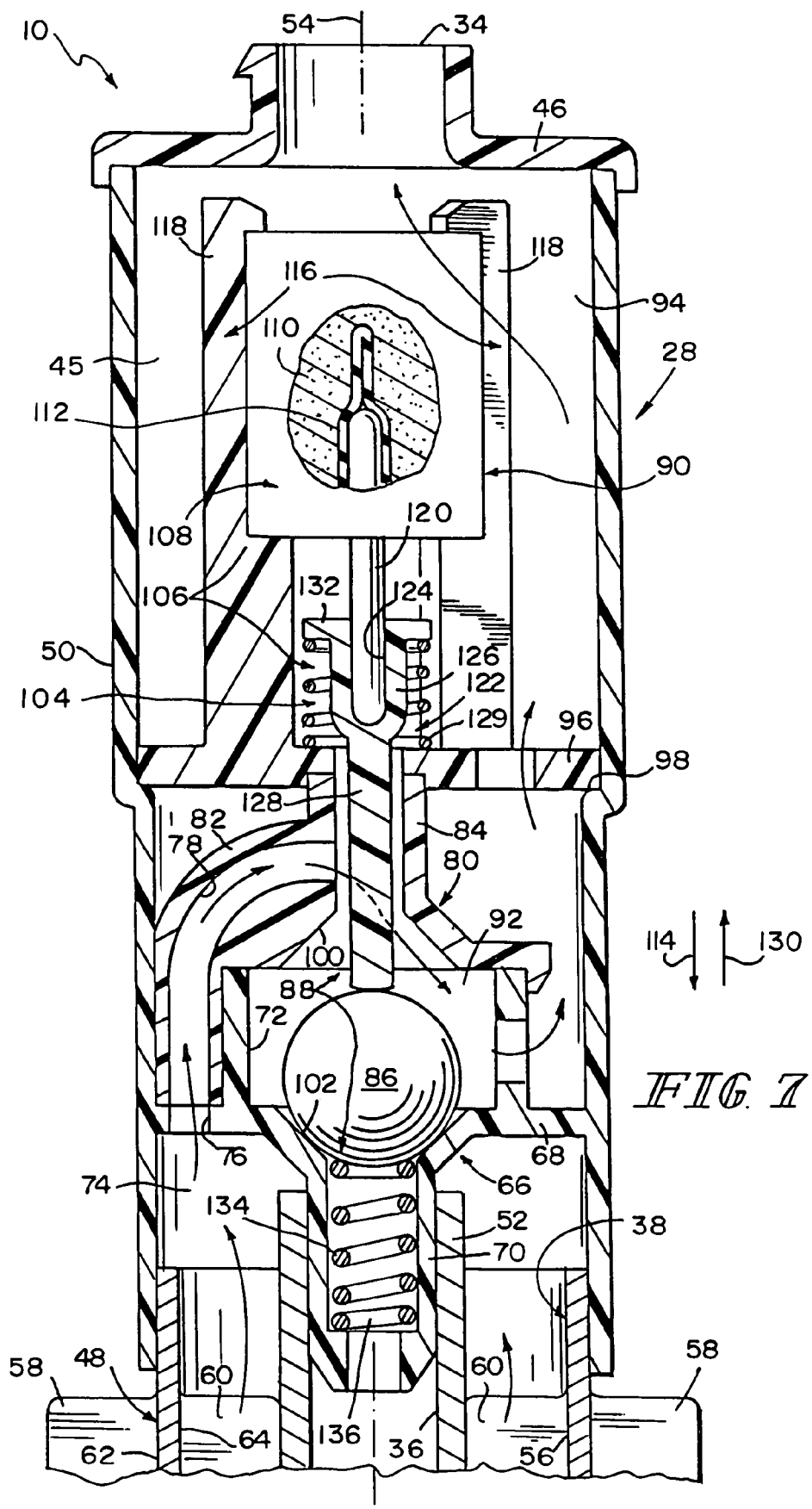
FIG. 7 is a sectional view similar to FIGS. 5 and 6 showing the piston of the wax motor positioning the valve in a higher temperature position allowing flow of fuel from the cooler passageway to the flow-controller passageway for discharge to the fuel tank and blocking flow of fuel from the insulator passageway to the flow-controller passageway when the wax motor senses that the temperature of fuel in the flow-controller passageway is higher than the predetermined higher temperature.

Module housing 28 includes a first module housing body 66 positioned in interior region 45, as shown, for example, in FIGS. 5–7. Body 66 includes an interior partition wall 68, a first coupler sleeve 70, and a second coupler sleeve 72. Coupler sleeves 70, 72 extend from partition wall 68 in axially opposite directions. First coupler sleeve 70 extends into insulator tube 52 and is coupled thereto. Partition wall 68 cooperates with outer tube 50 to provide therebetween an annular transition portion 74 of cooler passageway 38 to direct fuel from upstream portion 56 through an aperture 76 formed in partition wall 68 into a non-annular downstream portion 78 of cooler passageway 38 formed in a second module housing body 80 included in module housing 28 in interior region 45.

Second module housing body 80 is shown, for example, in FIGS. 5–8. Body 80 is coupled to second coupler sleeve 72. Body 80 includes an elbow 82 and a piston sleeve 84 coupled thereto. Elbow 82 and piston sleeve 84 cooperate to provide downstream portion 78 of cooler passageway 38.

Flow controller 42 is arranged to move relative to module housing 28 between a lower temperature position, an intermediate temperature position, and a higher temperature position in response to temperature of fuel in flow-controller passageway 40, as suggested, for example, in FIGS. 5–7.

Controller 42 assumes the lower temperature position shown, for example, in FIG. 5 when it senses that the temperature of fuel in flow-controller passageway 40 is below a predetermined lower temperature. In the lower temperature position, controller 42 allows flow of fuel from insulator passageway 36 to flow-controller passageway 40 and blocks flow of fuel from cooler passageway 38 to flow-controller passageway 40. Thermally insulating the returning fuel in this way minimizes the risk that the returning fuel will gel.

Controller 42 assumes the intermediate temperature position shown, for example, in FIG. 6 when it senses that the temperature of fuel in flow-controller passageway 40 is between the predetermined lower temperature and a predetermined higher temperature. In the intermediate temperature position, controller 42 allows flow of fuel from both insulator passageway 36 and cooler passageway 38 to flow-controller passageway 40. Fuel which has been insulated in insulator passageway 36 and fuel which has been cooled in cooler passageway 38 is thus allowed to mix together in flow-controller passageway 40 when controller 42 is in the intermediate position.

Controller 42 assumes the higher temperature position shown, for example, in FIG. 7 when it senses that the temperature of fuel in flow-controller passageway 40 is higher than the predetermined higher temperature. In the higher temperature position, controller 42 blocks flow of fuel from insulator passageway 36 to flow-controller passageway 40 and allows flow of fuel from cooler passageway 38 to controller passageway 40 to cause cooling of fuel before it returns to fuel tank 16. Some fuel tanks are susceptible to deformation or other damage when exposed to relatively hot temperatures. Cooling the returning fuel minimizes this risk.

Flow controller 42 thus provides flow controller means for controlling flow of fuel through insulator and cooler passageways 36, 38 to flow-controller passageway 40 in response to temperature of fuel in flow-controller passageway 40 so that fuel flows through insulator passageway 36 to flow-controller passageway 40 but not through cooler passageway 38 to flow-controller passageway 40 when the temperature of fuel in flow-controller passageway 40 is lower than a predetermined lower temperature, flows through cooler passageway 38 to flow-controller passageway 40 but not through insulator passageway 36 to flow-controller passageway 40 when the temperature of fuel in flow-controller passageway 40 is higher than a predetermined higher temperature, and flows through both insulator passageway 36 and cooler passageway 38 to flow-controller passageway 40 when the temperature of fuel in flow-controller passageway 40 is between the predetermined lower temperature and the predetermined higher temperature.

Flow controller 42 includes a valve 86, a valve mover 88, and a fuel temperature sensor 90, as shown, for example, in FIGS. 5–7. Valve 86 (e.g., a ball valve) is positioned in a valve chamber 92 formed between first and second module housing bodies 66, 80. Sensor 90 is positioned in flow-controller passageway 40 to sense the temperature of fuel therein just before discharge through outlet aperture 34, as shown, for example, in FIGS. 5–7. Sensor 90 is positioned in a sensor chamber 94 formed between outlet end cap 46 and an interior partition wall 96 coupled to outer tube 50 at a shoulder 98 formed in outer tube 50.

Valve mover 88 is arranged to move valve 86 along axis 54 in valve chamber 92 between the lower temperature position, the intermediate temperature position, and the higher temperature position in response to temperature of fuel sensed by sensor 90, as shown, for example, in FIG. 5–7. Valve 86 is arranged in valbe chamber 92 to engage and disengage a frusto-conical lower temperature valve seat 100 included in second module housing body 80 and a frusto-conical higher temperature valve seat 102 included in first module housing body 66 as valve mover 88 moves valve 86 between the lower, intermediate, and higher temperature positions.

Valve mover 88 positions valve 86 in the lower temperature position when sensor 90 senses that the temperature of fuel in controller passageway 40 is below the predetermined lower temperature, as shown, for example, in FIG. 5. In the lower temperature position, valve 90 engages lower temperature valve seat 100 included in second module housing body 80 to block flow of fuel from cooler passageway 38 to controller passageway 40 and is spaced-apart from higher temperature valve seat 102 to allow flow of fuel from insulator passageway 36 to controller passageway 40.

Valve mover 88 positions valve 86 in the intermediate temperature position when sensor 90 senses that the temperature of fuel in controller passageway 40 is between the predetermined lower temperature and the predetermined higher temperature, as shown, for example, in FIG. 6. In the intermediate temperature position, valve 90 is spaced apart from both valve seats 100, 102 to allow flow of fuel from insulator and cooler passageways 36, 38 to controller passageway 40.

Valve mover 88 positions valve 86 in the higher temperature position when sensor 90 senses that the temperature of fuel in controller passageway 40 is higher than the predetermined higher temperature, as shown, for example, in FIG. 7. In the higher temperature position, valve 90 engages higher temperature valve seat 102 to block flow of fuel from insulator passageway 36 to controller passageway 40 and is spaced apart from lower temperature valve seat 100 to allow flow of fuel from cooler passageway 38 to controller passageway 40.

Sensor 90 and a piston 104 included in valve mover 88 cooperate to provide a wax motor 106, as shown, for example, in FIGS. 5–7. Sensor 90 includes a motor housing 108 and wax 110 that is positioned in motor housing 108 and is responsive to temperature of fuel in controller passageway 40. A boot 112 included in motor housing 108 receives piston 104. Piston 104 is extensible from motor housing 108 to move valve 86 in a first axial direction 114 in sequence from the lower temperature position to the intermediate temperature position and to the higher temperature position in response to expansion of wax 110. Piston 104 is retractable into motor housing 108 upon contraction of wax 110. Wax motor 106, valve 86, insulator tube 52, and cooler tube 48 are coaxial relative to axis 54.

Module housing 28 includes a motor mount 116, as shown, for example, in FIG. 5–7. Motor housing 108 is coupled to motor 116. Illustratively, motor mount 116 includes a plurality (e.g., three) of axially extending fingers 118 that are cantilevered to partition wall 96 and extend axially in sensor chamber 94 to position sensor 90 therein.

Piston 104 includes a first stem 120 and a piston body 122, as shown, for example, in FIGS. 5–7. First stem 120 extends into boot 112 and into a bore 124 formed in a stem receiver 126 included in piston body 122. A second stem 128 included in piston body 122 extends from stem receiver 126 through an aperture 130 formed in partition wall 96 and downstream portion 78 of cooler passageway 38 to valve 86. Piston sleeve 84 surrounds second stem 128 as second stem 128 extends through downstream portion 78.

A piston retractor 129 is arranged to move piston 104 in a second axial direction 130 opposite to first axial direction 114 when wax 110 contracts due to cooling of fuel. Illustratively, piston retractor 129 is a spring surrounding piston 104 and engaging partition wall 96 and an annular flange 132 coupled to and extending radially outwardly from stem receiver 126.

A valve return 134 is arranged to move valve 86 in second axial direction 130 away from higher temperature valve seat 102 toward lower temperature valve seat 100 when wax 110 contracts due to cooling of fuel. Illustratively, valve return 134 is a spring that is positioned in first coupler sleeve 70 and engages valve 86 and a shoulder 136 formed in first coupler sleeve 70.

Module housing 28 is formed to include an intermediate chamber 138 in flow-controller passageway 40, as shown, for example, in FIGS. 5–7. Chamber 138 is formed between partition walls 68, 96 and has second module housing body 80 positioned therein. A first chamber connection aperture 140 formed in second coupler sleeve 72 interconnects valve chamber 92 and intermediate chamber 138 for flow of fuel from valve chamber 92 through first chamber connection aperture 140 to intermediate chamber 138. A second chamber connection aperture 142 formed in partition wall 96 interconnects intermediate chamber 138 and sensor chamber 94 for flow of fuel from intermediate chamber 138 through second chamber connection aperture 142 to sensor chamber 94. Intermediate chamber 138 acts as a mixing chamber for mixing of fuel discharged from insulator passageway 36 and fuel discharged from cooler passageway 38 when valve 86 is positioned in the intermediate temperature position.

The invention claimed is:

1. A return fuel temperature control module for use in controlling the temperature of fuel diverted away from an engine and returned to a fuel tank, the return fuel temperature control module comprising a module housing formed to include an insulator passageway adapted to insulate thermally fuel flowing therethrough, a cooler passageway adapted to cool fuel flowing therethrough and arranged in a parallel flow arrangement with the insulator passageway, and a flow-controller passageway located downstream from the insulator and cooler passageways to receive fuel therefrom, and flow controller means for controlling flow of fuel through the insulator and cooler passageways to the flow-controller passageway in response to temperature of fuel in the flow-controller passageway so that fuel flows through the insulator passageway to the flow-controller passageway but not through the cooler passageway to the flow-controller passageway when the temperature of fuel in the flow-controller passageway is lower than a predetermined lower temperature, flows through the cooler passageway to the flow-controller passageway but not through the insulator passageway to the flow-controller passageway when the temperature of fuel in the flow-controller passageway is higher than a predetermined higher temperature, and flows through both the insulator passageway and the cooler passageway to the flow-controller passageway when the temperature of fuel in the flow-controller passageway is between the predetermined lower temperature and the predetermined higher temperature.

2. The return fuel temperature control module of claim 1, wherein the module housing includes an insulator tube and a cooler tube surrounding the insulator tube so that the insulator tube and the cooler tube are positioned in coaxial relation with one another, the insulator tube is formed to include the insulator passageway, and at least a portion of the cooler passageway is formed between the cooler tube and the insulator tube.

3. The return fuel temperature control module of claim 2, wherein the cooler tube includes a radially outer surface and a radially inner surface, the module housing includes a plurality of axially extending outer fins coupled to the outer surface and spaced circumferentially apart from one another, the module housing includes a plurality of axially extending inner fins that are coupled to the inner surface, contact the insulator tube, and are spaced circumferentially apart from one another, and each outer fin is radially aligned with one of the inner fins.

4. The return fuel temperature control module of claim 2, wherein the flow controller means includes a valve and a wax motor including a motor housing positioned in the flow-controller passageway, temperature responsive wax positioned in the motor housing, and a piston extensible from the motor housing to move the valve relative to the module housing in response to expansion of the wax, and the insulator tube, the cooler tube, and the wax motor are coaxial with one another relative to an axis and the piston is arranged to move along the axis to move the valve along the axis.

5. The return fuel temperature control module of claim 1, wherein the flow controller means includes a valve and a wax motor positioned in the flow-controller passageway to move the valve relative to the module housing.

6. The return fuel temperature control module of claim 5, wherein the module housing includes a lower temperature valve seat and a higher temperature valve seat, the wax motor is arranged to move the valve between a lower temperature position in which the valve engages the lower temperature valve seat to block flow of fuel from the cooler passageway to the flow-controller passageway and to allow flow of fuel from the insulator passageway to the flow-controller passageway when the temperature of fuel in the flow-controller passageway is below a predetermined lower temperature, a higher temperature position in which the valve engages the higher temperature valve seat to block flow of fuel from the insulator passageway to the flow-controller passageway and to allow flow of fuel from the cooler passageway to the flow-controller passageway when the temperature of fuel in the flow-controller passageway is higher than a predetermined higher temperature, and an intermediate temperature position in which the valve is spaced apart from the lower temperature valve seat and the higher temperature valve seat to allow flow of fuel from the insulator passageway and the cooler passageway to the flow-controller passageway when the temperature of fuel in the flow-controller passageway is between the predetermined lower temperature and the predetermined higher temperature.

7. The return fuel temperature control module of claim 6, wherein the wax motor includes a motor housing positioned in the flow-controller passageway, temperature responsive wax positioned in the motor housing, and a piston extensible from the motor housing to move the valve in a first axial direction from the lower temperature valve seat toward the higher temperature valve seat in response to expansion of the wax.

8. The return fuel temperature control module of claim 7, wherein the flow controller means includes a piston retractor arranged to move the piston in a second axial direction opposite to the first axial direction upon contraction of the wax.

9. The return fuel temperature control device of claim 7, wherein the flow controller means includes a valve return arranged to move the valve against the piston toward the lower temperature valve seat in a second axial direction opposite to the first axial direction.

10. A return fuel temperature control module for use in controlling the temperature of fuel diverted away from an engine and returned to a fuel tank, the return fuel temperature control module comprising a module housing formed to include an insulator passageway adapted to insulate thermally fuel flowing therethrough, a cooler passageway adapted to cool fuel flowing therethrough and arranged in a parallel flow arrangement with the insulator passageway, and a flow-controller passageway located downstream from the insulator and cooler passageways to receive fuel therefrom, and a flow controller positioned in the flow-controller passageway and responsive to the temperature of fuel in the flow-controller passageway to control flow of fuel from the insulator and cooler passageways to the flow-controller passageway.

11. The return fuel temperature control module of claim 10, wherein the flow controller includes a wax motor positioned in the flow-controller passageway.

12. The return fuel temperature control module of claim 11, wherein the flow controller includes a valve and the wax motor includes a motor housing positioned in the flow-controller passageway, temperature responsive wax positioned in the motor housing, and a piston extensible from the motor housing to move the valve relative to the module housing in response to expansion of the wax.

13. The return fuel temperature control module of claim 12, wherein the module housing includes a lower temperature valve seat and a higher temperature valve seat and the piston is arranged to move the valve between a lower temperature position in which the valve engages the lower temperature valve seat to block flow of fuel from the cooler passageway to the flow-controller passageway and to allow flow of fuel from the insulator passageway to the flow-controller passageway when the temperature of fuel in the flow-controller passageway is below a predetermined lower temperature, a higher temperature position in which the valve engages the higher temperature valve seat to block flow of fuel from the insulator passageway to the flow-controller passageway and to allow flow of fuel from the cooler passageway to the flow-controller passageway when the temperature of fuel in the flow-controller passageway is higher than a predetermined higher temperature, and an intermediate temperature position in which the valve is positioned relative to the lower temperature valve seat and the higher temperature valve seat to allow flow of fuel from the insulator passageway and the cooler passageway to the flow-controller passageway when the temperature of fuel in the flow-controller passageway is between the predetermined lower temperature and the predetermined higher temperature.

14. The return fuel temperature control module of claim 13, wherein the lower temperature valve seat is positioned between the higher temperature valve seat and the motor housing.

15. The return fuel temperature control module of claim 12, wherein the module housing includes a motor mount and the motor housing is coupled to the motor mount.

16. The return fuel temperature control module of claim 15, wherein the module housing includes an interior wall and the motor mount includes a plurality of flexible fingers that are cantilevered to the interior wall and hold the motor housing therebetween.

17. The return fuel temperature control module of claim 12, wherein the piston includes a first stem extensible from the motor housing and a piston body engaging the first stem and the valve.

18. The return fuel temperature control module of claim 17, wherein the piston body includes a stem receiver formed to include a bore receiving the first stem, a second stem extending from the stem receiver through the cooler passageway to the valve, and a flange extending radially outwardly from the stem receiver, and the flow controller includes a piston retractor spring that surrounds the stem receiver and engages the flange to retract the first stem into the motor housing upon contraction of the wax.

19. The return fuel temperature control module of claim 10, wherein the cooler passageway surrounds the insulator passageway.

20. The return fuel temperature control module of claim 10, wherein the flow controller includes a fuel temperature sensor, a valve, and a valve mover, the fuel temperature sensor is positioned in the flow-controller passageway to sense temperature of fuel therein, and the valve mover is coupled to the fuel temperature sensor to move the valve relative to the module housing in response to the temperature sensed by the fuel temperature sensor.

21. The return fuel temperature control module of claim 20, wherein the fuel temperature sensor includes temperature responsive wax.

22. The return fuel temperature control module of claim 20, wherein module housing includes a lower temperature valve seat and a higher temperature valve seat, the valve mover is arranged to move the valve between a lower temperature position in which the valve engages the lower temperature valve seat to block flow of fuel from the cooler passageway to the flow-controller passageway and to allow flow of fuel from the insulator passageway to the flow-controller passageway when the fuel temperature sensor senses that the temperature of fuel in the fuel controller passageway is below a predetermined lower temperature, a higher temperature position in which the valve engages the higher temperature valve seat to block flow of fuel from the insulator passageway to the flow-controller passageway and to allow flow of fuel from the cooler passageway to the flow-controller passageway when the fuel temperature sensor senses that the temperature of fuel in the flow-controller passageway is higher than a predetermined higher temperature, and an intermediate temperature position in which the valve is spaced apart from the lower temperature valve seat and the higher temperature valve seat to allow flow of fuel from the insulator passageway and the cooler passageway to the flow-controller passageway when the fuel temperature sensor senses that the temperature of fuel in the flow-controller passageway is between the predetermined lower temperature and the predetermined higher temperature.

23. The return fuel temperature control module of claim 22, wherein the module housing is formed to include a valve chamber, a sensor chamber, and an intermediate chamber positioned in fluid communication with the valve chamber and the sensor chamber to conduct fuel therebetween, the valve, the lower temperature valve seat, and the higher temperature valve seat are positioned in the valve chamber, and the fuel temperature sensor is positioned in the sensor chamber.

24. The return fuel temperature control module of claim 23, wherein the module housing includes an insulator tube, a cooler tube surrounding the insulator tube in coaxial relation therewith, and an inlet end cap coupled to the cooler tube and formed to include an inlet aperture to admit fuel into the module housing, the insulator tube is formed to include the insulator passageway, a first portion of the cooler passageway is formed between the cooler tube and the insulator tube, the module housing further includes an outlet end cap formed to include an outlet aperture to discharge fuel from the housing, an outer tube coupled to the cooler tube and the outlet end cap, a first partition wall that is positioned within the outer tube, is spaced apart from the outlet end cap to provide the sensor chamber between the first partition wall and the outlet end cap, and is formed to include a chamber connection aperture interconnecting the intermediate chamber and the sensor chamber for fluid communication therebetween, and first and second module housing bodies coupled to one another to provide the valve chamber, the first module housing body includes the higher temperature valve seat and a second partition wall coupled to the outer tube and spaced apart from the first partition wall to provide the intermediate chamber therebetween, and the second module housing body is positioned in the intermediate chamber between the first and second partition walls, includes the lower temperature valve seat which is located between the higher temperature valve seat and the fuel temperature sensor, and is formed to include a non-annular second portion of the cooler passageway downstream from the first portion.

25. The return fuel temperature control module of claim 24, wherein the valve is a ball valve, the fuel temperature sensor includes a motor housing held by flexible fingers coupled to the first partition wall and wax that is positioned in the motor housing and is expandable in response to temperature of fuel in the sensor chamber, the valve mover includes a piston and a valve return spring, the piston is extensible from the motor housing in response to expansion of the wax for axial movement through an aperture formed in the first partition wall and through the second portion of the cooler passageway to move the valve axially from the lower temperature valve seat to the higher temperature valve seat against a force exerted on the piston by a piston retractor spring included in the flow controller and a force exerted on the valve by the valve return spring, the piston retractor spring engages the first partition wall and a flange included in the piston, and the valve return spring engages the valve and a shoulder formed in a coupler sleeve that extends from the second partition wall into the insulator tube and is coupled to the insulator tube.

26. The return fuel temperature control module of claim 24, wherein the first module housing body includes a coupler sleeve that extends from the second partition wall, is coupled to the second housing body, and is formed to include a chamber connection aperture interconnecting the valve chamber and the intermediate chamber for fluid communication therebetween.

27. The return fuel temperature control module of claim 24, wherein the second module housing body includes an elbow and a piston sleeve coupled to the elbow, the elbow and the piston sleeve cooperate to provide the second portion of the cooler passageway, and the piston is positioned in the piston sleeve for movement therein.

28. The return fuel temperature control module of claim 10, wherein the flow controller is arranged to move relative to the module housing between a lower temperature position blocking flow of fuel from the cooler passageway to the flow-controller passageway and allowing flow of fuel from the insulator passageway to the flow-controller passageway when the temperature of fuel in the flow-controller passageway is below a predetermined lower temperature, a higher temperature position blocking flow of fuel from the insulator passageway to the flow-controller passageway and allowing flow of fuel from the cooler passageway to the flow-controller passageway when the temperature of fuel in the flow-controller passageway is higher than a predetermined higher temperature, and an intermediate temperature position allowing flow of fuel from the insulator passageway and the cooler passageway to the flow-controller passageway when the temperature of fuel in the flow-controller passageway is between the predetermined lower temperature and the predetermined higher temperature.

29. A return fuel temperature control module for use in controlling the temperature of fuel diverted away from an engine and returned to a fuel tank, the return fuel temperature control module comprising
 a module housing formed to include an inlet aperture adapted to admit fuel into the module housing, an outlet aperture adapted to discharge fuel from the module housing, an insulator passageway located downstream from the inlet aperture to receive fuel therefrom and adapted to insulate thermally fuel flowing through the insulator passageway, a cooler passageway located downstream from the inlet aperture in a parallel flow arrangement with the insulator passageway and adapted to cool fuel flowing through the cooler passageway, and a flow-controller passageway extending from the insulator and cooler passageways to the outlet aperture to conduct fuel from the insulator and cooler passageways to the outlet aperture, and
 a valve positioned within the module housing, and
 a wax motor positioned in the flow-controller passageway and responsive to temperature of fuel in the flow-controller passageway to move the valve relative to the module housing to control flow of fuel from the insulator and cooler passageways to the flow-controller passageway to promote compliance of the temperature of fuel discharged from the outlet aperture with predetermined temperature criteria.

30. The return fuel temperature control module of claim 29, wherein the wax motor includes a motor housing positioned in the flow-controller passageway, temperature responsive wax positioned in the motor housing, and a piston extensible from the motor housing to move the valve relative to the module housing in response to expansion of the wax.

31. The return fuel temperature control module of claim 30, wherein the module housing includes a first valve seat and a second valve seat, the valve is a ball valve, and the piston engages the ball valve to move the ball valve from the first valve seat to the second valve seat in response to expansion of the wax.

32. The return fuel temperature control module of claim 29, wherein the module housing includes a lower temperature valve seat and a higher temperature valve seat and the wax motor is arranged to move the valve between a lower temperature position in which the valve engages the lower temperature valve seat to block flow of fuel from the cooler passageway to the flow-controller passageway and to allow flow of fuel from the insulator passageway to the flow-controller passageway when the temperature of fuel in the flow-controller passageway is below a predetermined lower temperature, a higher temperature position in which the valve engages the higher temperature valve seat to block flow of fuel from the insulator passageway to the flow-controller passageway and to allow flow of fuel from the cooler passageway to the flow-controller passageway when the temperature of fuel in the flow-controller passageway is higher than a predetermined higher temperature, and an intermediate temperature position in which the valve is positioned relative to the lower temperature valve seat and the higher temperature valve seat to allow flow of fuel from the insulator passageway and the cooler passageway to the flow-controller passageway when the temperature of fuel in the flow-controller passageway is between the predetermined lower temperature and the predetermined higher temperature.

33. The return fuel temperature control module of claim 29, wherein the module housing includes an insulator tube and a cooler tube surrounding the insulator tube so that the insulator tube and the cooler tube are positioned in coaxial relation with one another, the insulator tube is formed to include the insulator passageway, and the cooler tube and the insulator tube cooperate to form at least a portion of the cooler passageway therebetween.

34. The return fuel temperature control module of claim 33, wherein the module housing includes a plurality of outer fins coupled to an outer surface included in the cooler tube.

35. The return fuel temperature control module of claim 33, wherein the module housing includes a plurality of inner fins coupled to an inner surface included in the cooler tube.

36. The return fuel temperature control module of claim 33, wherein the insulator tube is made of nylon and the cooler tube is made of aluminum.

* * * * *